United States Patent Office 2,883,304
Patented Apr. 21, 1959

---

2,883,304

PIGMENT-BINDING METHODS

Benjamin B. Kine, Levittown, and Albert C. Nuessle, Hatboro, Pa., assignors to Rohm & Haas Company, Philadelphia, Pa., a corporation of Delaware No Drawing. Application April 14, 1954
Serial No. 423,244

21 Claims. (Cl. 117—161)

The present invention relates to compositions for coloring various substrates or materials and is particularly concerned with pigment-containing compositions that are adapted to be applied to textile materials either for coloring the textile throughout its area as in pigment-dyeing or at localized areas as in printing operations.

Aqueous solutions containing starch and water-soluble linear polymers have commonly been employed for binding pigments in pigment-dyeing procedures. They have the disadvantages of requiring the use of low concentration solutions or highly viscous solutions which do not penetrate well. They invariably stiffen the fabric, cause the feel or hand of the fabric to vary considerably with changes in humidity, tend to yellow on aging, tend to render the fabric more subject to bacterial and fungal attack, and tend to poor wash-fastness.

Synthetic linear polymers of the vinyl and acrylic types are capable of serving as binders for pigments, but generally they are characterized by insufficient resistance to laundering or washing operations because of their tendency to become plastic and exhibit plastic flow to some degree at temperatures that are normally employed for washing operations.

It is an object of the present invention to provide synthetic resinous binder compositions for pigments which are free of the disadvantages of aqueous starch solutions and comprise certain linear polymers of monoethylenically unsaturated monomeric materials which, when applied to textiles or other objects, are capable of further reaction to produce a cross-linked binder characterized by adequate resistance to washing at the normal temperatures employed for laundering and even for scouring. Another object is to provide colored textile materials which are resistant to normal dry-cleaning operations. Other objects and advantages of the invention will be apparent from the description thereof hereinafter.

The improved pigment-binding compositions of the present invention comprise aqueous dispersions of a water-insoluble linear copolymer of monoethylenically unsaturated molecules comprising a ureido-vinyl ether monomer having the general formula $$CH_2=CH-O-A-NRCONHR'$$

where A is selected from a class consisting of branched or straight chain alkylene groups having 2 to 4 carbon atoms between adjoining oxygen and nitrogen atoms and ether-oxygen linked alkylene groups having 2 to 3 carbon atoms, and R and R' are each selected individually from the class consisting of hydrogen, lower aliphatic groups having 1 to 3 carbon atoms, and ether-linked lower aliphatic groups having 1 to 3 carbon atoms, except that R may form with R' a ring-closing alkylene group selected from the class consisting of ethylene (—CH$_2$—CH$_2$—), propylene (—CH(CH$_3$)CH$_2$—), and trimethylene —(CH$_2$)$_3$—. The group taking the position of A may be ethoxyethyl and —C$_2$H$_4$(OC$_2$H$_4$)$_n$— and examples of ether-linked lower aliphatic groups which may take the place of R and R' include C$_2$H$_5$OC$_2$H$_4$— and C$_2$H$_5$(OC$_2$H$_4$)$_n$— where n is any integer but is preferably not over 2.

It has been found that textiles colored with pigments carried in a resinous binder derived from copolymers containing 1% to 15% by weight of at least one of the above monomers are adequately wash-resistant for practical purposes. These aqueous dispersions may be of high concentration (even up to 70% solids) while remaining low in viscosity so that higher concentrations can be readily applied and drying time and effort can be greatly reduced. These dispersions are capable of producing a wide variety of hands from soft to firm or stiff, if desired. Fabrics treated with them do not yellow on aging and their susceptibility to bacterial or fungal attack is not increased by treatment.

Specific examples of the copolymers are those obtained by the polymerization with other monomers, of:

1. Vinyloxyethylurea $$CH_2=CH-O-C_2H_4NHCONH_2$$

2. N-vinyloxyethyl-N,N'-ethylene-urea

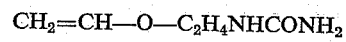

3. 1-(2-vinyloxyethyl)-2-hexahydropyrimidone

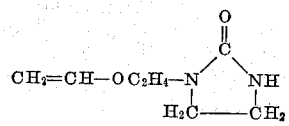

4. 1-(2-vinyloxypropyl)-2-imidazolidone

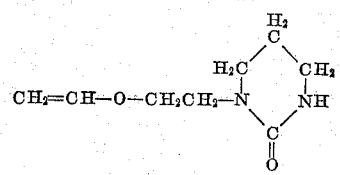

5. N-methyl-N-vinyloxyethylurea

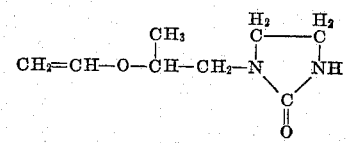

6. N-vinyloxyethyl-N'-ethyl-urea $$CH_2=CH-O-C_2H_4NHCONHC_2H_5$$

7. Vinoxyethoxyethylurea $$CH_2=CH-O-C_2H_4OC_2H_4NHCONH_2$$

8. Vinyloxyethoxyethoxyethylurea $$CH_2=CH-O-C_2H_4OC_2H_4OC_2H_4NHCONH_2$$

9. β-Ureidoisobutyl vinyl ether $$CH_2=CH-O-CH_2-C(CH_3)_2-NHCONH_2$$

The aqueous dispersions may be prepared by dispersing, dissolving, or emulsifying in water, and then copolymerizing with the aid of a catalyst, a mixture of one or more of the monomers specified above in admixture with one or more other monoethylenically unsaturated copolymerizable monomers such as N-dialkyl acrylamides, e.g., N-dimethyl, -diethyl, -dipropyl, -dibutyl, -diamyl, -dihexyl, and -dioctyl acrylamides; the acrylic, alpha-alkyl acrylic and alpha-haloacrylic esters of saturated monohydric alcohols, especially of saturated aliphatic monohydric alcohols, e.g., the methyl, ethyl, propyl, isopropyl, butyl, isobutyl, and amyl esters of acrylic, methacrylic, ethacrylic, propacrylic, chloroacrylic, bromoacrylic acids; the phenyl, benzyl, and phenyl-ethyl esters of the aforementioned acids; vinyl aromatic compounds, e.g., styrene, alpha-methyl styrene, dimethylstyrenes, dichlorostyrenes, the various cyanostyrenes, the various methoxystyrenes, vinyl naphthalenes, e.g., 4-chloro-1-vinyl-naphthalene; vinyl and vinylidene halides, e.g., vinyl and vinylidene chlorides, bromides, etc.; alkyl vinyl ketones, e.g., methyl vinyl ketone, ethyl vinyl ketone, methyl isopropenyl ketone, etc.; itaconic diesters containing a single $CH_2=C<$ grouping, e.g., the dimethyl, diethyl, dipropyl, dibutyl and other saturated aliphatic monohydric alcohol diesters of itaconic acid, diphenyl itaconate, dibenzyl, itaconate, ditolyl itaconate, di-(phenylethyl) itaconate; vinyl, allyl and methallyl esters of saturated aliphatic monocarboxylic acids, e.g., vinyl, allyl and methallyl acetates, vinyl, allyl and methallyl propionates, vinyl, allyl and methallyl valerates; vinyl thiophene; 4-vinyl pyridine; vinyl pyrrole; nitriles containing a single $CH_2=C<$ grouping, e.g., acrylonitrile, methacrylonitrile, etc. Copolymerization by addition to the $C=C$ group may be assisted by means of a peroxy catalyst, such as hydrogen peroxide or ammonium persulfate. The emulsification and polymerization may be assisted by a non-ionic emulsifying agent that serves also to stabilize the dispersion of the copolymer after completion of the copolymerization. The comonomers selected and the proportions thereof should be such as to produce a water-insoluble linear copolymer. The molecular weight of the copolymers may range from 10,000 to as high as 4,000,000.

Particularly valuable resin dispersions are obtained by the copolymerization in an emulsion system of at least one of the ureido-vinyl ether monomers with one or more monomeric esters of acrylic and/or methacrylic acid in which the alkyl group contains one to eight carbon atoms such as methyl, ethyl, n-propyl, isopropyl, n-butyl, isobutyl, sec-butyl, tert-butyl, isoamyl, tert-amyl, hexyl, heptyl, n-octyl, 2-ethylhexyl.

The polymerizable emulsions can be prepared at temperatures from 0° to about 100° C., but intermediate temperatures are much preferred. Thus, with the acrylic esters in which the alkyl group contains one to four carbon atoms a temperature from about 10° C. to about 60° C. is employed whereas a higher temperature; e.g., 30° C. to 80° C., is recommended when esters containing five to eight carbon atoms in the alkyl group are copolymerized. Peroxidic free-radical catalysts, particularly catalytic systems of the redox-type, are recommended. Such systems, as is well known, are combinations of oxidizing agents and reducing agents such as a combination of potassium persulfate and sodium metabisulfate. Other suitable periodic agents include the "persalts" such as the alkali metal and ammonium persulfates and perborates, hydrogen peroxide, organic hydroperoxides such as tert-butyl hydroperoxide and cumene hydroperoxide, and esters such as tert-butyl perbenzoate. Other reducing agents include water-soluble thiosulfates and hydrosulfites and the salts, such as the sulfates, of metals which are capble of existing in more than one valence state, such as cobalt, iron, nickel, and copper. The most convenient method of preparing the dispersions of copolymers comprises agitating an aqueous suspension or emulsion of a mixture of copolymerizable monomers and a redox catalytic combination at room temperature without the application of external heat. The amount of catalyst can vary but for purposes of efficiency from 0.01% to 3.0%, based on the weight of the monomers, of the peroxidic agent and the same or lower proportions of the reducing agent are recommended. In this way, it is possible to prepare dispersions which contain as little as 1% and as much as 60% or even more of the resinous copolymer on a weight basis. It is, however, more practical and hence preferred, to produce dispersions which contain about 30%–50% resin-solids.

Any water-insoluble pigment may be used including azo-pigments and lakes, pthalocyanine pigments, vat dyestuffs in their water-insoluble form, and inorganic pigments such as carbon black, iron oxides, chrome yellows, titanium dioxide and lithopone. Powdered or flaked metals may also be included, such as aluminum, bronze, brass, chromium, or gold. Mixtures may be used if desired.

In addition to the other ingredients, the aqueous dispersions and pastes may contain a water-soluble thickening agent, such as gum tragacanth, water-soluble cellulose ethers, polyvinyl alcohol or partially saponified polyvinyl acetate. The aqueous pastes may contain a mild alkali, for example, sodium acetate, sodium carbonate, chalk, morpholine or ammonia, including, if desired, a mixture of water-soluble substances which form a conventional mildly alkaline buffer. The proportions of the several ingredients in the aqueous dispersions and pastes can be varied widely, and they are adjusted in any convenient manner so that the dispersions and pastes have a consistency suitable for application to the fabric by the particular technique to be employed for this purpose.

The ratio of the pigment to the binder is preferably within the range of 1:1 to 1:8 by weight but may be higher or lower if desired especially to produce novelty effects, such as for embossing. The pigment may be dispersed in the aqueous emulsion before polymerization, but is preferably dispersed into the aqueous copolymer dispersion after completion of the polymerization. Similarly, thickener is preferably introduced after polymerization, particularly when a large amount thereof is used for the purpose of rendering the composition of high consistency to adapt it for printing. The composition may be applied to the textile in a pad when overall coloring is desired. It may instead be applied by rolls, particularly printing rolls, when localized coloring is desired. Stencilling or any other system of application may also be resorted to. Generally, regardless of what system is employed, a relatively small increase in weight of the textile is required in order to provide adequate coloration thereof. For example, an increase in weight of 1%–10% in the colored areas may be obtained.

The compositions of the present invention are characteristically aqueous and contain no volatile organic solvent. They accordingly involve no fire hazard, or health hazard as a result of toxicity. Storage and use of the compositions accordingly require the simplest of facilities, no elaborate protective or solvent-recovery systems being required. They are also substantially odorless or at the worst, have but a slight, inoffensive odor.

The coloring composition may be applied to textiles of all kinds, including woven, knitted, or other types of textile fabrics, such as felts. The fibers or yarns of the fabric may be formed of cotton, rayon, silk, wool, linen; cellulose esters, such as cellulose acetate; proteinaceous types, such as casein, soya bean protein; also linear polymeric types, such as the polyamides (nylon), polyesters, such as polyglycol terephthalate (Dacron); and the vinyl types, such as polyethylene, polyvinyl chloride, polyvinylidene chloride, polyacrylonitrile; copolymers of vinyl chloride with vinyl acetate, acrylonitrile, vinylidene chloride or the like; copolymers of vinylidene chloride with vinyll acetate, ethylene or crylonitrile; copolymers of acrylontrile with vinyl acetate, methacrylonitrile, vinyl pyridines, or with mixtures of the latter monomers.

The heating required for drying is believed to crosslink the polymer chains and impart insolubility and permanence to the colored fabric. However, in the composition as applied to the fabric, the copolymer is essentially linear in character so that on drying, it is coalescible into a film binding the pigment therein. On subsequent heating, the fixation that occurs does not require the addition of a catalyst. Possibly the copolymer dispersion may contain acid residues left therein at the completion of the copolymerization. However, a small amount of an acidic catalyst such as ammonium chloride or p-toluene sulfonic acid may be added to the dispersion, or applied to the treated fabric before fixation of the copolymer thereon by heating, to accelerate cross-linking through the ureido groups. The colored fabrics are characterized by good resistance to washing and cyclic ageing (alternate exposure to light and washing), and practical resistance to crocking. Since the coatings need no external plasticizer to provide flexibility, they do not suffer embrittlement on ageing as a result of loss of plasticizer.

The aqueous dispersion containing the linear copolymer may be provided with an auxiliary cross-linking agent if it is desired to enhance the resistance to washing and when it is desired to render the product even more resistant to dry-cleaning. The auxiliary cross-linking agent is preferably added to the aqueous dispersion or paste which contains the linear copolymer and pigment, although, if desired, the pigment may be added after the cross-linking agent has been incorporated into the copolymer dispersion and when a paste is employed, the thickener may be introduced as the final step in preparation of the composition. The proportion of the cross-linking agent that is added is such that the ratio between the weights of the linear copolymer and the cross-linking agent is within the range of 6:1 to 1:6 and preferably within the range of 5:2 to 2:5. Whether or not an auxiliary cross-linking agent is used, the ratio of the weight of the pigment to the total weight of binder (including the cross-linking agent when used) is preferably within the range of 1:1 to 1:8. Acidic catalysts, such as pyridine hydrochloride, ammonium chloride, benzyldimethylamine oxalate, the hydrochloride of 2-methyl-2-amino-1-propanol, are preferably used with the cross-linking agent but are not essential.

The auxiliary cross-linking agent is an organic compound containing a reactive group which is in effect bivalent, such as formaldehyde, or containing at least two reactive functional groups. For example, there may be used diamines, such as ethylenediamine, diethylene-triamine, and triethylenetetramine, formaldehyde, or dialdehydes, such as glyoxal, and propandial. There may also be used as a cross-linking agent the low molecular weight condensation polymers (which may be of such molecular size as to prevent diffusion into cellulose but are still water-dispersible, including those in acid colloid form), or monomeric reaction products of an aldehyde, such as formaldehyde, with urea, thiourea, biuret, or other homologues or derivatives thereof, such as N,N-ethyleneurea, N-N'-ethyleneurea, N,N'-dimethylurea, N,N'-diethylurea, N,N-dimethoxymethylurea, N,N-di-methoxymethylurea, N,N'-diethoxyethylurea, tetrameth-oxymethylurea, tetraethoxyethylurea. Similar reaction products of formaldehyde with triazines, such as melamine may also be employed, such as N,N-dimethylmel-amine and alcohol-modified melamine-formaldehyde thermosetting resin condensates, e.g., of methyl and ethyl alcohols, for example, dimethoxymethyl-monomethylol-melamine. Likewise, similar reaction products of form-aldehyde with mixtures of a triazine with urea, biuret, thiourea, or other urea derivatives may be used. Bi-functional substances of the formula

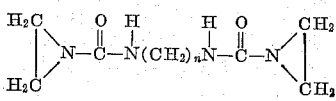

in which n may be any integer from 2 to 6, such as hexamethylene-bis-N,N-ethyleneurea, are also useful. Similarly, reaction products of formaldehyde with alkyl, alkylene, aralkyl, cycloalkyl, or aryl substitution products of biguanide including those, such as ethylene di-biguanide, in which more than one biguanide radical is attached to a single organic residue. Such substituted biguanides can be obtained by the action of dicyandi-amide on the hydrochloride of the appropriate alkyl-, aralkyl-, cyclo-alkyl- or aryl-amine. Primary or secondary amines can be used. Thus mono-biguanides can be obtained from dicyandiamide and ethylamine, diethylamine, hydroxyethylamine, propylamine, butylamine, 2-hydroxy-propylamine, benzylamine, aniline, toluidines, and methoxyanilines, and dibiguanides from ethylene-diamine, alpha-beta-diamino-propane, trimethylene di-amine, and hexamethylene diamine and other alkylene diamines.

The reaction between dicyandiamide and an amine hydrochloride is conveniently effected by heating at temperatures of the order of 150–200° C. It appears that the reaction often proceeds, at least in part, beyond the formation of the simple biguanide radical

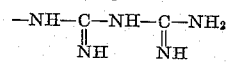

since some ammonia is given off. Possibly two biguanide radicals lose ammonia with formation of a polyguanide radical such as

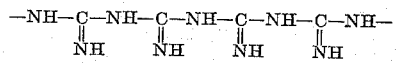

Other cross-linking agents include polyacrylic acid, polymethacrylic acid, or copolymers thereof, either water-soluble or water-insoluble, with a catalyst, such as pyridine or benzyldimethylamine.

After application of the aqueous dispersion to the fabrics, the latter is subjected to an insolubilization or curing action, such as by drying and heating to a temperature of 180° F. to 350° F. for periods of half a minute to 15 or 30 minutes or more, the higher the temperature used, the lower the time needed in most cases. This curing or baking operation should be carried on at a temperature below that which causes appreciable deterioration of the fabric material. During the curing of the polymer, it apparently cross-links with itself and it is possible that it may also react with certain groups of the textile materials, particularly in the case of the cellulosic textiles. When an auxiliary cross-linking agent is present, there is a still further inter-combining action that probably occurs. In any event, whatever the reactions involved, there is obtained a highly stable pigmented area substantially permanently bonded to the textile material. The pigmented areas are durable against the temperatures encountered during normal usage and also during such washing, dry-cleaning, laundering, and scouring operations as the particular textile material carrying the pigmented coating is normally subjected.

The following examples are illustrative of the invention:

Example 1

An aqueous dispersion of a copolymer is obtained by the emulsion copolymerization of 90 parts by weight of n-butyl acrylate and 10 parts by weight of $\beta$-ureidoiso-butyl vinyl ether (compound $9$ above) in the presence of ammonium persulfate, sodium bisulfite, triethanol-amine, and an ethylene oxide condensation product of a t-octylphenol containing from 30 to 50 oxyethylene units per molecule as an emulsifier and/or dispersing agent. A pigment (Monastral Fast Blue BFP—a phthalocyanine blue) and water-soluble hydroxyethyl cellulose are mixed into the dispersion in such amounts and the dispersion is diluted to such extent as to produce an aqueous dispersion containing 5% of the copolymer, 2.5% of the pigment, 2% of the dispersing agent and 0.05% of the hydroxy-ethyl cellulose.

A cotton fabric (80 x 80 sheeting) is passed through a padder containig the resulting dispersion to effect overall coloration. After drying at 240° F. and then curing at 300° F. for 10 minutes, one portion of the fabric is subjected to a wash test consisting of 40 minutes in 0.1% sodium stearate at 180° F. while tumbling, followed by several 10-minute rinses in water. Another portion is partially exposed to light in a fadeometer for 50 hours and then is washed in the manner just described. The latter test is a type of "cyclic aging" test and serves to detect any degeneration of the binder under the action of light. Such degeneration, if present, causes the removal of part of the pigment during the subsequent washing. The dyeing shows good resistance to both washing and cyclic ageing.

*Example II*

The procedure of Example I was followed except that the pigment dispersion included 2% of dimethylol-N,N'-ethyleneurea and 0.25% of pyridine hydrochloride. The dyeing showed even better wash fastness than that of Example I.

*Example III*

The procedure of Example I was followed except that the pigment dispersion included 2.5% of dimethoxymethyl monomethylol melamine and 0.3% 2-methyl-2-amino-propanol hydrochloride. The dyeing was similar to that of Example II in its resistance to washing and cyclic ageing.

*Example IV*

The procedure of Example I was followed with a copolymer of 95% ethyl acrylate with 5% vinyloxybutylurea, but the pigment dispersion was applied to a rayon challis. The dyeing showed good resistance to washing, dry-cleaning and cyclic ageing, and exhibited a slightly firmer hand than that of Example I.

*Example V*

The procedure of Example IV was followed except that the pigment dispersion contained 5% dimethoxymethylurea and ½% of pyridine hydrochloride. The fabric was crease-proofed and stabilized against shrinkage on washing and the dyeing showed good resistance to washing, dry-cleaning, and cyclic ageing.

*Example VI*

The procedure of Example I was followed with a copolymer of 90% n-butyl acrylate with 10% of the N,N'-ethyleneureidoethyl vinyl ether (compound 2 above). The dyeing showed good resistance to washing and cyclic ageing.

*Example VII*

The procedure of Example VI was followed except that the 2.5% blue pigment was replaced with 1½% of chrome yellow and after drying but before curing, the fabric was impregnated by a 2% solution of glyoxal. The final dyeing showed good fastness to washing, dry-cleaning, and cyclic ageing.

*Example VIII*

The procedure of Example I was followed with a copolymer of 95% of n-butyl acrylate and 5% of vinyloxyethylurea. Dyeings of good fastness to washing and cyclic ageing were obtained.

*Example IX*

The procedure of Example VIII was followed except that the pigment dispersion included 2% of hexamethylene-bis-N,N-ethyleneurea and 0.2% of pyridine hydrochloride.

*Example X*

The procedure of Example I was followed with a copolymer of 5% N-methyl-N-vinyloxyethylurea (compound 5 above) and 90% of isopropyl acrylate except that the pigment was replaced by a corresponding amount of chrome yellow (lead chromate). The dyeings were fast to washing and cyclic ageing tests.

*Example XI*

The procedure of Example X was followed except that after drying at 240° F. but before curing at 300° F. the dyed fabric was passed through a 1% solution of formaldehyde. Similar results were obtained.

*Example XII*

The procedure of Example I was followed with a copolymer of 12% vinyloxyethoxyethylurea (compound 7 above), 25% styrene, and 63% n-propyl acrylate.

*Example XIII*

The procedure of Example I was followed with a copolymer of 67% ethyl acrylate, 32% methyl methacrylate, and 1% of compound 4 in the list above. Wash-fast dyeing was obtained.

*Example XIV*

The procedure of Example XIII was followed except that 1% of propandial and 0.05% of pyridine hydrochloride were added to the pigment dispersion. Wash-fast dyeing was obtained.

*Example XV*

The procedure of Example I was followed with a copolymer of 90% ethyl acrylate and 10% of compound 3 above. Wash-fast dyeing was obtained.

*Example XVI*

The procedure of Example I was followed with a copolymer of 92% n-butyl acrylate and 8% of compound 2 above. Wash-resistant dyeings were obtained.

The compositions of the present invention may be applied to numerous types of substrates, such as paper, paperboard, wallboard, plastered walls, metals, woods, leathers, cements, stucco, concrete, and glass for providing a colored coating thereon. The copolymer may be cured merely by prolonged standing at room temperature or by heating at elevated temperature and the composition may contain auxiliary cross-linkers as described hereinabove.

It is to be understood that changes and variations may be made without departing from the spirit and scope of the invention as defined in the appended claims.

We claim:

1. A method for coloring a textile material comprising the steps of applying to a textile fabric an aqueous composition comprising a water-insoluble pigment intimately mixed with a binder comprising a water-insoluble linear copolymer of monoethylenically unsaturated monomers consisting of 85% to 99% by weight of at least one alkyl ester of an acid selected from the group consisting of acrylic and methacrylic acids in which the alkyl group contains 1 to 8 carbon atoms and 1 to 15% by weight of a monomer having the general formula $$CH_2=CH-O-A-NRCONHR'$$

where A is selected from the class consisting of (1) etheroxygen linked alkylene groups having 2 to 3 carbon atoms and (2) alkylene groups having 2 to 4 carbon atoms between the adjoining oxygen and nitrogen atoms, and R and R' are each selected from (1) separate groups individually selected from the class consisting of hydrogen, methyl, ethyl, propyl, isopropyl, and ether-linked lower aliphatic groups having 1 to 3 carbon atoms and (2) composite ring-closing alkylene groups selected from the class consisting of $-CH_2CH_2-$, $-CH(CH_3)CH_2-$ and 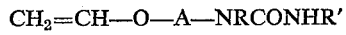, the ratio of the weights of binder to pigment being from 1:1 to 8:1, and then drying and heating the fabric at a temperature of 180° to 350° F. for a period of a half-minute to about thirty minutes.

2. As an article of manufacture, a textile fabric obtained by the process of claim 1.

3. A method as defined in claim 1 in which the composition is in the form of a printable paste containing a water-soluble polymeric thickener.

4. A method as defined in claim 1 in which the monomer is β-ureidoisobutyl vinyl ether.

5. A method as defined in claim 1 in which the monomer is N,N'-ethyleneureidoethyl vinyl ether.

6. A method as defined in claim 1 in which the monomer is vinyloxyethylurea.

7. A method as defined in claim 1 in which the monomer is vinyloxethoxyethylurea.

8. A method as defined in claim 1 in which the monomer is vinyloxybutylurea.

9. A method as defined in claim 1 in which the binder comprises a copolymer of β-ureidoisobutyl vinyl ether with n-butyl acrylate.

10. A method as defined in claim 1 in which the binder comprises a copolymer of N,N'-ethyleneureidoethyl vinyl ether with n-butyl acrylate.

11. A method as defined in claim 1 in which the binder comprises a copolymer of vinyloxyethylurea with n-butyl acrylate.

12. A method as defined in claim 1 in which the binder comprises a copolymer of vinyloxyethoxyethylurea with n-propyl acrylate and styrene.

13. A method for coloring a textile material comprising the steps of applying to a textile fabric an aqueous composition comprising a water-insoluble organic pigment intimately mixed with a binder comprising a water-insoluble linear copolymer of (a) 1 to 15% by weight of a monomer having the general formula $$CH_2=CH-O-A-NRCONHR'$$

where A is an alkylene group having 2 to 4 carbon atoms between adjoining oxygen and nitrogen atoms and R and R' are alkyl groups having 1 to 3 carbon atoms with (b) 99% to 85% by weight respectively of an alkyl ester of acrylic acid in which the alkyl group contains 1 to 8 carbon atoms, the ratio of the weights of binder to pigment being from 1:1 to 8:1, and then drying and heating the fabric at a temperature of 180° to 350° F. for a period of a half-minute to about thirty minutes.

14. A method for coloring a textile material comprising the steps of applying to a textile fabric an aqueous composition comprising a water-insoluble organic pigment intimately mixed with a binder comprising a water-insoluble linear copolymer of (a) 1 to 15% by weight of a monomer having the general formula $$CH_2=CHOANHCONH_2$$

where A is an alkylene group having 2 to 4 carbon atoms between adjoining oxygen and nitrogen atoms with (b) 99% to 85% by weight respectively of an alkyl ester of acrylic acid in which the alkyl group contains 1 to 8 carbon atoms, the ratio of the weights of binder to pigment being from 1:1 to 8:1, and then drying and heating the fabric at a temperature of 180° to 350° F. for a period of a half-minute to about thirty minutes.

15. A method for coloring a textile material comprising the steps of applying to a textile fabric an aqueous composition comprising a water-insoluble pigment intimately mixed with a binder comprising a water-insoluble linear copolymer of (a) 1 to 15% by weight of a monomer having the general formula $$CH_2=CH-O-A-NRCONHR'$$

where A is selected from a class consisting of (1) ether-oxygen linked alkylene groups having 2 to 3 carbon atoms and (2) alkylene groups having 2 to 4 carbon atoms between adjoining oxygen and nitrogen atoms, and R and R' are each selected from (1) separate groups individually selected from the class consisting of hydrogen, methyl, ethyl, propyl, isopropyl, and ether-linked lower aliphatic groups having 1 to 3 carbon atoms and (2) composite ring-closing alkylene groups selected from the class consisting of $-CH_2CH_2-$, $-CH(CH_3)CH_2-$ and $-CH_2CH_2CH_2-$, with (b) 99% to 85% by weight respectively of an alkyl ester of an acid selected from the group consisting of acrylic and methacrylic acids in which the alkyl group contains 1 to 8 carbon atoms, and a cross-linking agent selected from the group consisting of organic compounds containing at least two functional groups reactive with the ureido group of the copolymer, said functional groups being selected from the group consisting of amino, carboxyl, aldehyde, methylol and methoxymethyl groups, the ratio of the weights of the copolymer to the cross-linker being from 6:1 to 1:6 and the ratio of the weights of binder to pigment being from 1:1 to 8:1, and then drying and heating the fabric at a temperature of 180° to 350° F. for a period of a half-minute to about thirty minutes.

16. A method as defined in claim 15 in which the cross-linking agent is selected from the group consisting of formaldehyde, glyoxal, and propandial.

17. A method as defined in claim 15 in which the cross-linking agent is a reaction product of formaldehyde with a member selected from the class consisting of urea, N,N-ethyleneurea, N,N'-ethyleneurea, melamine, N,N-dimethylmelamine, and hexamethylene-bis-N,N-ethyleneurea.

18. A method as defined in claim 15 in which the cross-linking agent is glyoxal.

19. A method as defined in claim 15 in which the cross-linking agent is dimethylol-N,N'-ethyleneurea.

20. A method as defined in claim 1 in which the cross-linking agent is dimethoxymethylmonomethylolmelamine.

21. As an article of manufacture, a textile fabric obtained by the process of claim 15.

References Cited in the file of this patent
UNITED STATES PATENTS

| | | |
|---|---|---|
| 2,689,844 | Melamed | Sept. 21, 1954 |
| 2,694,696 | Melamed | Nov. 16, 1954 |
| 2,719,832 | Cramer et al. | Oct. 4, 1955 |